US012563523B2

(12) United States Patent
Tsumura et al.

(10) Patent No.: US 12,563,523 B2
(45) Date of Patent: Feb. 24, 2026

(54) INFORMATION PROCESSING APPARATUS, SERVICE PROVISION METHOD, NON-TRANSITORY COMPUTER READABLE MEDIUM, AND SERVICE PROVISION SYSTEM

(71) Applicant: NEC Corporation, Tokyo (JP)

(72) Inventors: Shusuke Tsumura, Tokyo (JP); Kazuki Yoshida, Tokyo (JP); Takayuki Sasaki, Tokyo (JP); Goh Shibata, Tokyo (JP); Dai Yokoi, Tokyo (JP); Yuki Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 334 days.

(21) Appl. No.: 18/029,502

(22) PCT Filed: Oct. 12, 2020

(86) PCT No.: PCT/JP2020/038532
§ 371 (c)(1),
(2) Date: Mar. 30, 2023

(87) PCT Pub. No.: WO2022/079778
PCT Pub. Date: Apr. 21, 2022

(65) Prior Publication Data
US 2023/0370997 A1    Nov. 16, 2023

(51) Int. Cl.
*H04W 64/00* (2009.01)
*H04B 17/27* (2015.01)

(52) U.S. Cl.
CPC .......... *H04W 64/006* (2013.01); *H04B 17/27* (2015.01)

(58) Field of Classification Search
CPC ..... H04W 64/006; H04W 4/02; H04W 4/029; H04W 4/80; H04W 4/021; H04W 64/00;
(Continued)

(56) References Cited

U.S. PATENT DOCUMENTS

2005/0136845 A1* 6/2005 Masuoka ............... H04B 17/27
455/67.14
2013/0059542 A1 3/2013 Shimizu
(Continued)

FOREIGN PATENT DOCUMENTS

JP 2012-160846 A 8/2012
JP 2013-055543 A 3/2013
(Continued)

OTHER PUBLICATIONS

JP Office Communication for JP Application No. 2022-557247, mailed on Feb. 4, 2025 with English Translation.
(Continued)

*Primary Examiner* — Nimesh Patel
(74) *Attorney, Agent, or Firm* — Sughrue Mion, PLLC

(57) ABSTRACT
An information processing apparatus includes acquisition means for acquiring a first received signal strength of a beacon signal at a communication terminal transmitted from at least one beacon transmitter arranged in each of a plurality of areas arranged along a route; specification means for specifying a first area among the plurality of areas where a user using the communication terminal is present and an area movement history of the user based on the first received signal strength; and control means for deciding whether or not to provide a service to the communication terminal based on the first area and the area movement history.

12 Claims, 14 Drawing Sheets

(58) Field of Classification Search

CPC ....... H04W 4/025; H04W 4/023; H04W 4/06; H04W 84/12; H04W 4/027; H04W 36/0085; H04W 4/024; H04W 4/33; H04W 40/20; H04W 36/008375; H04W 4/38; H04W 76/00; H04W 36/322; H04W 4/50; H04W 84/042; H04W 48/18; H04W 28/0268; H04W 8/20; H04W 40/244; H04W 36/302; H04W 52/0245; H04W 84/045; H04W 16/28; H04W 36/037; H04W 36/0016; H04W 36/32; H04W 52/0229; H04W 72/542; H04W 28/08; H04W 36/362; H04W 36/00835; H04W 36/0083; H04W 36/00837; H04W 36/00838; H04W 52/241; H04W 52/223; H04W 48/04; H04B 17/27; H04B 17/318; H04B 10/25752; H04B 7/02; H04B 7/0617; H04B 17/26; H04B 7/0413; H04B 17/373; G06F 13/00; H04M 11/00; H04M 15/58; H04M 2215/0188; H04M 1/72457; H04M 2215/2026; H04M 2215/32; H04M 2250/02; H04M 2250/04; H04L 67/12; H04L 67/52; H04L 67/5683; H04L 9/0872; H04L 41/0894; H04L 65/80; H04L 67/101; H04L 2209/80; H04L 41/147; G01S 5/14; G01S 1/0426; G01S 5/04; G01S 5/0278; G01S 5/0236; G01S 5/017; G01S 19/51; G01S 5/0294; G01S 2201/025; G01S 5/02; G01S 5/0242; G01S 7/417; G01S 5/0226; G01S 5/0063; G01S 7/415; G01S 13/62; G01S 19/42; G01S 2205/008; Y02D 30/70; Y02D 30/50; G06Q 10/047; G06Q 10/06395; G06Q 30/0261; G06Q 50/10; G06Q 50/26; G01C 21/206; G01C 5/06; G01C 25/00; G01C 21/3476; G01C 21/3626; Y02P 90/80; Y02P 10/25

See application file for complete search history.

(56) References Cited

U.S. PATENT DOCUMENTS

| | | | | |
|---|---|---|---|---|
| 2013/0122935 | A1* | 5/2013 | Das | H04W 4/029 |
| | | | | 455/456.6 |
| 2015/0038140 | A1* | 2/2015 | Kilpatrick, II | H04W 68/02 |
| | | | | 455/436 |
| 2018/0146343 | A1* | 5/2018 | Lee | A63F 13/35 |
| 2018/0313944 | A1* | 11/2018 | Park | G01S 11/06 |
| 2021/0266859 | A1* | 8/2021 | Yu | G01S 5/04 |
| 2022/0007134 | A1 | 1/2022 | Shibata | |

FOREIGN PATENT DOCUMENTS

| | | |
|---|---|---|
| JP | 2019-121209 A | 7/2019 |
| WO | 2017/154354 A1 | 9/2017 |
| WO | 2019/225115 A1 | 11/2019 |
| WO | 2020/066825 A1 | 4/2020 |

OTHER PUBLICATIONS

International Search Report for PCT Application No. PCT/JP2020/038532, mailed on Dec. 28, 2020.

* cited by examiner

100

BEACON GROUP 2 IN LAST 1 SECOND IS 80% OR MORE
→BEACON GROUP 2 IS THRESHOLD OR MORE

SERVICE PROVISION DETERMINATION TABLE T1

| TARGET AREA | MOVEMENT DIRECTION | PROVISION OF SERVICE | PROVIDED SERVICE |
|---|---|---|---|
| AREA 1 | AREA 2⇒AREA 1 | YES | VOICE SERVICE |
| AREA 2 | AREA 1⇒AREA 2 | YES | VIDEO SERVICE |
| AREA 1 | AREA A⇒AREA 1 | NO | – |
| ⋮ | ⋮ | ⋮ | ⋮ |

INFORMATION PROCESSING APPARATUS, SERVICE PROVISION METHOD, NON-TRANSITORY COMPUTER READABLE MEDIUM, AND SERVICE PROVISION SYSTEM

This application is a National Stage Entry of PCT/JP2020/038532 filed on Oct. 12, 2020, the contents of all of which are incorporated herein by reference, in their entirety.

TECHNICAL FIELD

The present disclosure relates to an information processing apparatus, a service provision method, a non-transitory computer readable medium, and service provision system.

BACKGROUND ART

Services using user location information are being studied (e.g., Patent Literature 1 and 2). Patent Literature 1 discloses that it is determined whether or not a game can be played based on a user's state including the user's location information. Patent Literature 2 discloses a content distribution system that displays relevant content related to a location of a mobile terminal on a screen of the mobile terminal.

CITATION LIST

Patent Literature

Patent Literature 1: International Patent Publication No. WO2019/225115
Patent Literature 2: Japanese Unexamined Patent Application Publication No 2012-160846

SUMMARY OF INVENTION

Technical Problem

In recent years, as a service using the user's location information, for example, a service providing a UX (User Experience) according to the user's location has been studied. However, in the case of a UX according to the user's location, there are cases where the service does not necessarily respond immediately to the state of the user's movement, and there is a demand to provide a UX that also takes into consideration the state of the user's movement.

One of the objects of the present disclosure is to provide an information processing apparatus, a service provision method, a non-transitory computer readable medium, and a service provision system that can provide a service according to a state of a user's movement.

Solution to Problem

An information processing apparatus according to the present disclosure includes:

acquisition means for acquiring a first received signal strength of a beacon signal at a communication terminal transmitted from at least one beacon transmitter arranged in each of a plurality of areas arranged along a route;

specification means for specifying a first area among the plurality of areas where a user using the communication terminal is present and an area movement history of the user based on the first received signal strength; and control means for deciding whether or not to provide a service to the communication terminal based on the first area and the area movement history.

A service provision method according to the present disclosure includes:

acquiring a first received signal strength of a beacon signal at a communication terminal transmitted from at least one beacon transmitter arranged in each of a plurality of areas arranged along a route;

specifying a first area among the plurality of areas where a user using the communication terminal is present and an area movement history of the user based on the first received signal strength; and deciding whether or not to provide a service to the communication terminal based on the first area and the area movement history.

A non-transitory computer readable medium according to the present disclosure causes a computer to execute processing of:

acquiring a first received signal strength of a beacon signal at a communication terminal transmitted from at least one beacon transmitter arranged in each of a plurality of areas arranged along a route;

specifying a first area among the plurality of areas where a user using the communication terminal is present and an area movement history of the user based on the first received signal strength; and deciding whether or not to provide a service to the communication terminal based on the first area and the area movement history.

A service provision system according to the present disclosure includes:

a plurality of beacon transmitters arranged in plurality of areas arranged along a route; and an information processing apparatus.

The information processing apparatus:

acquires a first received signal strength of a beacon signal at a communication terminal transmitted from at least one beacon transmitter among the plurality of beacon transmitters;

specifies a first area among the plurality of areas where a user using the communication terminal is present and an area movement history of the user based on the first received signal strength; and decides whether or not to provide a service to the communication terminal based on the first area and the area movement history.

Advantageous Effects of Invention

According to the present disclosure, it is possible to provide an information processing apparatus, a service provision method, a non-transitory computer readable medium, and a service provision system that can provide a service according to a state of a user's movement.

BRIEF DESCRIPTION OF DRAWINGS

FIG. 8 shows an example of a service provision determination table;

EXAMPLE EMBODIMENT

Example embodiments of the present disclosure are described below with reference to the drawings. The following descriptions and drawings have been omitted and simplified as appropriate for clarity of explanation. In addition, in each of the following drawings, the same elements are assigned the same symbols, and repeated descriptions have been omitted as necessary.

First Example Embodiment

Figure 1:
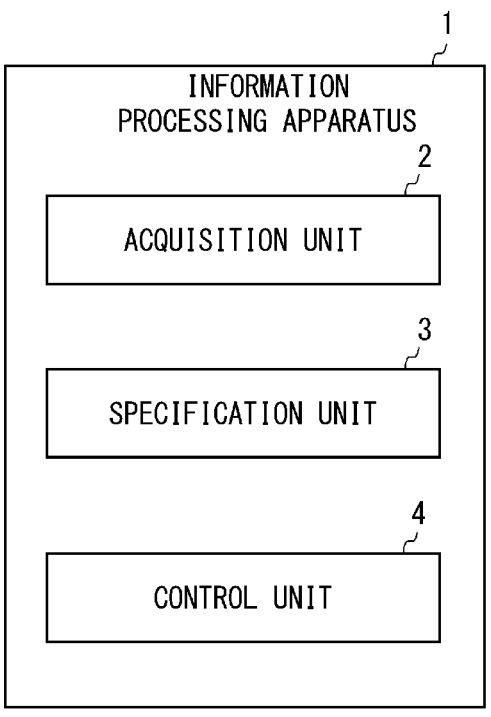
FIG. 1 shows an example of a configuration of an information processing apparatus according to a first example embodiment.

A configuration example of an information processing apparatus 1 according to a first example embodiment will be described with reference to FIG. 1. FIG. 1 shows a configuration example of the information processing apparatus according to the first example embodiment. The information processing apparatus 1 may be a server apparatus or a communication terminal. The information processing apparatus 1 includes an acquisition unit 2, a specification unit 3, and a control unit 4.

The acquisition unit 2 acquires a first received signal strength of a beacon signal at a communication terminal transmitted from at least one beacon transmitter (not shown) arranged in each of a plurality of areas arranged along a route. The communication terminal is configured to be capable of receiving the beacon signals transmitted from the plurality of beacon transmitters, and receives the beacon signal transmitted from at least one beacon transmitter among the plurality of beacon transmitters. The beacon signals transmitted from the plurality of beacon transmitters are signals compliant with BLE (Bluetooth (registered trademark) Low Energy).

When the information processing apparatus 1 is a server apparatus, the acquisition unit 2 acquires the first received signal strength by receiving, from the communication terminal, the first received signal strength of the beacon signal received by the communication terminal (not shown). When the information processing apparatus 1 is the above communication terminal, the acquisition unit 2 receives the beacon signal transmitted from at least one beacon transmitter and acquires the first received signal strength.

Based on the acquired first received signal strength, the specification unit 3 specifies a first area where a user who uses the communication terminal is present among the plurality of areas arranged along the route and an area movement history of the user. The area movement history is information indicating which area the user using the communication terminal has moved.

Based on the specified first area and the specified area movement history, the control unit 4 decides whether or not to provide a service to the communication terminal.

Figure 2:
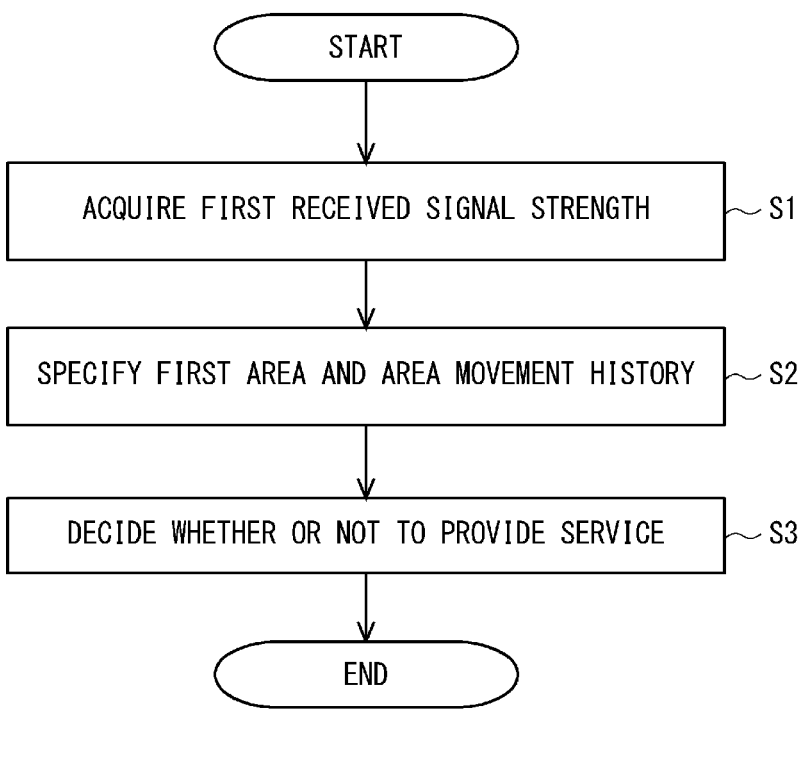
FIG. 2 shows a flowchart showing an example of the configuration of the information processing apparatus according to the first example embodiment.

Next, an operation example of the information processing apparatus 1 according to the first example embodiment will be described with reference to FIG. 2. FIG. 2 is a flowchart showing an operation example of the information processing apparatus according to the first example embodiment.

The acquisition unit 2 acquires the first received signal strength of the beacon signal at the communication terminal transmitted from at least one beacon transmitter arranged in each of the plurality of areas arranged along the route (Step S1).

Based on the acquired first received signal strength, the specification unit 3 specifies the first area where the user who uses the communication terminal is present among the plurality of areas arranged along the route and an area movement history of the user (Step S2).

Based on the specified first area and the specified area movement history, the control unit 4 decides whether or not to provide a service to the communication terminal (Step S3).

As described above, the information processing apparatus 1 specifies the first area where the user is present and the area movement history of the user based on the first received signal strength of the beacon signal, and decides whether or not to provide the service based on the first area and the area movement history.

In other words, the information processing apparatus 1 decides whether or not to provide the service using not only the area where the user is present but also the area movement history indicating how the user has moved the areas. Therefore, according to the information processing apparatus 1 of the first example embodiment, the service can be provided according to not only the location of the user but also the state of the user's movement.

Second Example Embodiment

Next, a second example embodiment is described. The second example embodiment is a specific example embodiment of the first example embodiment.
<Configuration Example of Service Provision System>

Figure 3:
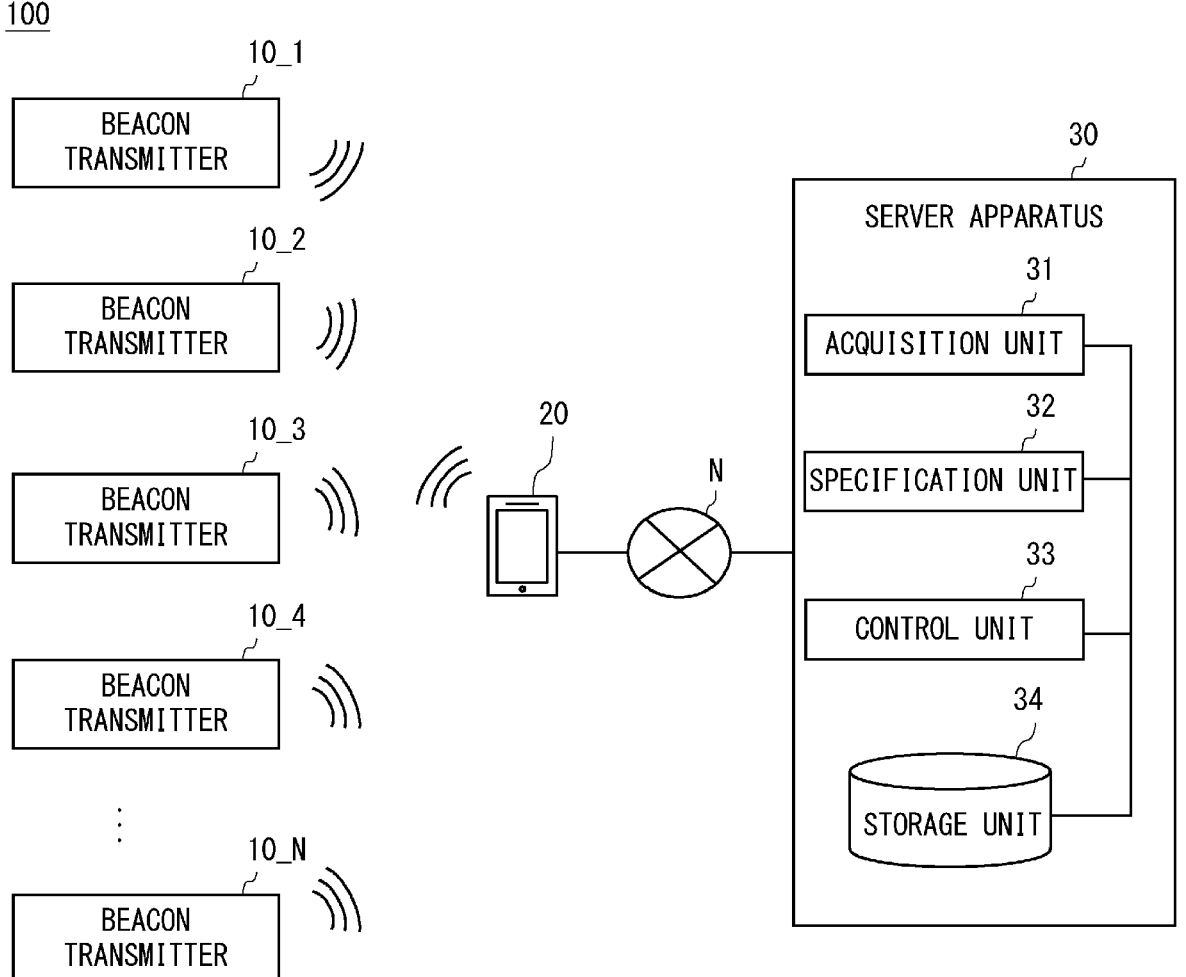
FIG. 3 shows an example of a configuration of a service provision system according to a second example embodiment.

An example configuration of a service provision system 100 according to the second example embodiment will be described with reference to FIG. 3. FIG. 3 shows a configuration example of the service provision system according to the second example embodiment. As shown in FIG. 3, the service provision system 100 includes beacon transmitters 10_1 to 10_N (N: an integer of 5 or more), a communication terminal 20, and a server apparatus 30. Although the service provision system 100 is configured to have N beacon transmitters, it may be configured to have at least four beacon transmitters.

Each of the beacon transmitters 10_1 to 10_N transmits a beacon signal that is a signal compliant with BLE. The beacon transmitters 10_1 to 10_N are arranged, for example, along a route that a person can move. The route that a person can move may be an indoor route or an outdoor route. A plurality of areas are continuously arranged along the route. Since each of the areas is specified by detecting a beacon signal, it may be referred to as a beacon detection area.

Each of the beacon transmitters 10_1 to 10_N is arranged in one of the plurality of areas. In each of the plurality of areas, two or more non-overlapping beacon transmitters among the beacon transmitters 10_1 to 10_N are arranged, and the two or more beacon transmitters form a beacon group. That is, the plurality of areas are set along the route, and in each area, the beacon group is arranged, and each beacon group is formed by two or more beacon transmitters.

Figure 4:
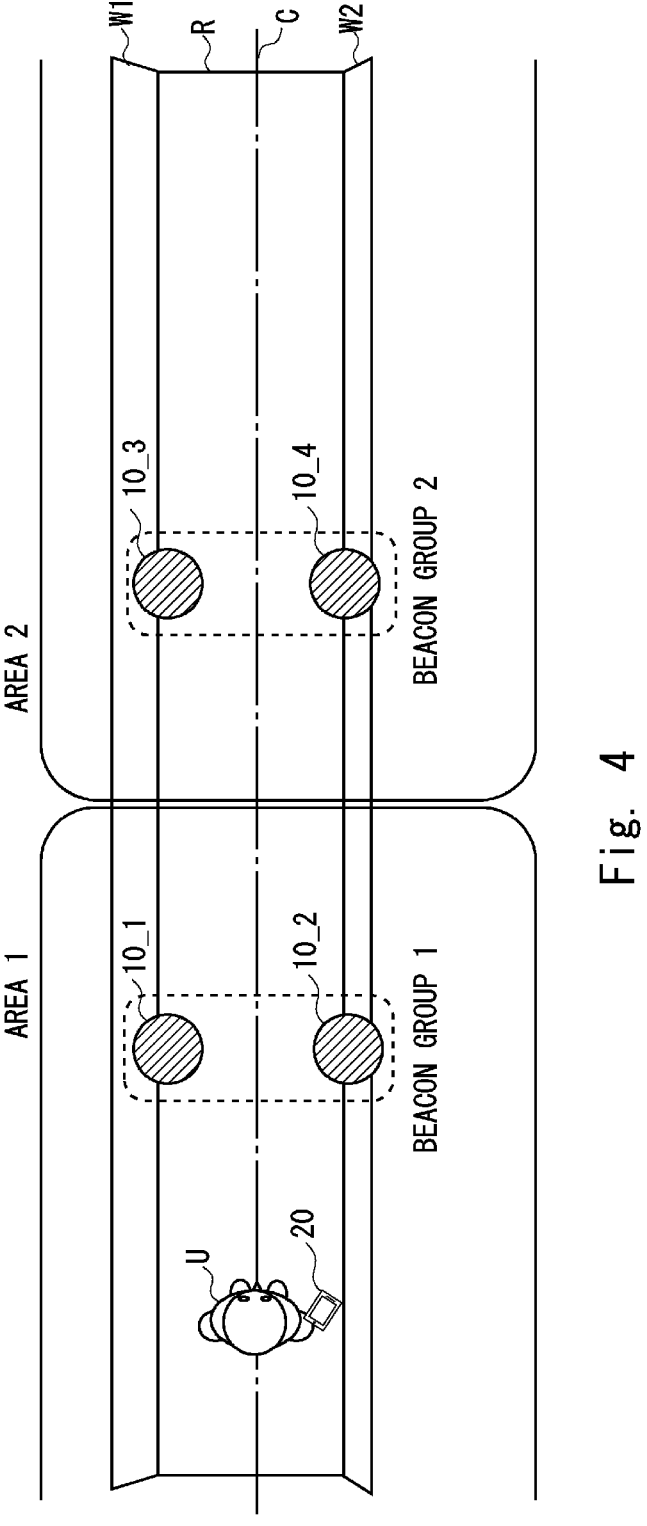
FIG. 4 shows an example of an arrangement of beacon transmitters and a relationship between areas and beacon groups.

Here, an example of an arrangement of the beacon transmitters 10_1 to 10_N and the relationship between areas and beacon groups are described with reference to FIG. 4. FIG. 4 is a diagram for explaining an example of the arrangement of beacon transmitters and the relationship between areas and beacon groups. FIG. 4 is overview diagram when a part of the route described above is viewed vertically above. For convenience of explanation, only the beacon transmitters 10_1 to 10_4 are shown in FIG. 4, and the illustration of the beacon transmitters 10_5 to 10_N is omitted.

As shown in FIG. 4, the beacon transmitters 10_1 to 10_4 are arranged along a route R. In the route R, a plurality of areas are set continuously along the route R, such as areas 1 and 2. Although only the areas 1 and 2 are shown in FIG. 4, adjacent areas are set continuously for each of areas 1 and 2.

In each area, two or more beacon transmitters among the beacon transmitters 10_1 to 10_N are arranged. In one example shown in FIG. 4, the beacon transmitters 10_1 and 10_2 are arranged in the area 1, and the beacon transmitters 10_3 and 10_4 are arranged in the area 2. In FIG. 4, two beacon transmitters are arranged in each area (area 1 and area 2), but three or more beacon transmitters may be arranged in each area.

The beacon transmitters arranged in each area are, for example, arranged opposite to each other across the route R. In one example shown in FIG. 4, the beacon transmitters 10_1 and 10_2 arranged in the area 1 are arranged opposite to each other across the route R, the beacon transmitter 10_1 is arranged on a wall W1 which is a side wall of the route R, and the beacon transmitter 10_2 is arranged on a wall W2 which is a side wall of the route R. Similarly, the beacon transmitters 10_3 and 10_4 arranged in the area 2 are arranged opposite to each other across the route R, the beacon transmitter 10_3 is arranged on the wall W1, and the beacon transmitter 10_2 is arranged on the wall W2. In this way, the beacon transmitters arranged in each area are arranged opposite to each other across the route R. Therefore, for example, even if there is another user between the user U using the communication terminal 20 and the beacon transmitter 10_2, the communication terminal 20 used by the user U can receive the beacon signal of the beacon transmitter 10_1. Thus, even if there is another user between the user U and the beacon transmitter 10_2, the area where the user U is present can be specified with high probability by the beacon signal received by the communication terminal 20 used by the user U.

In FIG. 4, although it has been described that the beacon transmitters arranged in each area are arranged on the walls W1 and W2, which are the side walls of the route R, they can be arranged opposite to each other with reference to a line C, which is the center line of each area. Therefore, the beacon transmitters arranged in each area may be arranged, for example, on a ceiling of the route R or on a ground surface of the route R. Even if the beacon transmitters are arranged in this way, the area where the user U is present can be specified with high probability by the beacon signals from the beacon transmitters arranged in each area.

The beacon transmitters arranged in each area form a beacon group. As shown in FIG. 4, the beacon transmitters 10_1 and 10_2 arranged in the area 1 form a beacon group 1, which is a first beacon group. In addition, the beacon transmitters 10_3 and 10_4 arranged in the area 2 form a beacon group 2, which is a second beacon group.

The beacon transmitter arranged in the area 1 and the beacon transmitter arranged in the area 2 and next to this beacon transmitter arranged in the area 1 are, for example, arranged at least several tens of centimeters apart from each other. More specifically, the beacon transmitter 10_1 arranged in the area 1 and the beacon transmitter 10_3 arranged in the area 2 and next to the beacon transmitter 10_1 arranged in the area 1 are arranged at least several tens of centimeters apart from each other. Similarly, the beacon transmitters 10_2 and 10_4 are arranged at least several tens of centimeters apart. The distance between the beacon transmitter arranged in the first area and the beacon transmitter arranged in the second area and next to this beacon transmitter arranged in the first area may be, for example, 10 meters and can be adjusted as appropriate.

Returning to FIG. 3, the communication terminal 20 will be described. The communication terminal 20 is, for example, a communication terminal such as a smartphone, a tablet terminal, or a mobile phone. The communication terminal 20 is a communication terminal used by the user U shown in FIG. 4. The communication terminal 20 connects and communicates with the server apparatus 30 via the network N. The network N may be a wired network, a wireless network, or a combination of a wired network and a wireless network.

The communication terminal 20 is configured to be capable of receiving the beacon signals transmitted from the beacon transmitters 10_1 to 10_N. The communication terminal 20 receives at least one of the beacon signals transmitted from the beacon transmitters 10_1 to 10_N. From the received beacon signal, the communication terminal 20 acquires identification information about the beacon transmitter that has transmitted the beacon signal and the received signal strength of the beacon signal. The communication terminal 20 transmits the acquired identification information and the acquired received signal strength to the server apparatus 30. The communication terminal 20 also acquires the time when the beacon signal is received and transmits the acquired time to the server apparatus 30.

The identification information about the beacon transmitter may be a beacon ID (Identifier) identifying the beacon transmitter, an identification number identifying the beacon transmitter or a name identifying the beacon transmitter. The beacon ID may be composed of a combination of UUID (Universally Unique Identifier), Major, and Minor as used in iBeacon (registered trademark). The received signal strength may be RSSI (Received Signal Strength Indicator) or RSRP (Reference Signal Received Power). In the following description, the identification information about the beacon transmitter is the beacon ID, and the received signal strength is RSSI.

The server apparatus 30 corresponds to the information processing apparatus 1 according to the first example embodiment. By receiving, from the communication terminal 20, the beacon ID and RSSI of the beacon signal received by the communication terminal 20 and the time when the beacon signal is received, the server apparatus 30 acquires the beacon ID and the RSSI of the beacon signal received by the communication terminal 20 and the time. The server apparatus 30 specifies the area where the user U using the communication terminal 20 is present based on the beacon ID and the RSSI acquired from the communication terminal 20.

The server apparatus 30 stores the area where the user using the communication terminal 20 is present and the area where the user was present in the past as an area movement history list, and specifies the area movement history based on the area movement history list. The server apparatus 30 decides whether or not to provide a service to the communication terminal 20 based on the area where the user using the communication terminal 20 is present and the area movement history. The area movement history list will be described later.

<Configuration Example of Server Apparatus>

Next, a configuration example of the server apparatus 30 will be described. The server apparatus 30 includes an acquisition unit 31, a specification unit 32, a control unit 33, and a storage unit 34.

The acquisition unit 31 also functions as a communication unit and connects and communicates with the communication terminal 20 via the network N. The acquisition unit 31 acquires information about the beacon signal received by the communication terminal 20 from the communication terminal 20. The acquisition unit 31 acquires the RSSI from the communication terminal 20 by receiving, from the communication terminal 20, the RSSI of the beacon signal at the communication terminal 20 transmitted from at least one of the beacon transmitters 10_1 to 10_N received by the communication terminal 20. The acquisition unit 31 acquires the beacon ID by receiving, from the communication terminal 20, the beacon ID received by the communication terminal 20 that identifies the beacon transmitter that has transmitted the beacon signal transmitted from at least one beacon transmitter. The acquisition unit 31 acquires the time when the communication terminal 20 receives the beacon signal from the communication terminal 20.

Based on the beacon ID and the RSSI acquired by the acquisition unit 31, the specification unit 32 specifies the area where the user U using the communication terminal 20 is present among the plurality of areas arranged along the route R shown in FIG. 4. Based on the area where the user U is present and the area where the user U was present, the specification unit 32 specifies the area movement history of the user U. The area movement history is information indicating the area the user U using the communication terminal 20 has moved. The specification unit 32 specifies the area the user U has moved from and the area the user U has moved to. The specification unit 32 specifies the area where the user U is present and the area movement history by performing beacon reception history list update processing, beacon group decision processing, and area determination processing.

<Beacon Reception History List Update Processing>

When the acquisition unit 31 acquires the information about the beacon signal from the communication terminal 20, the specification unit 32 performs the beacon reception history list update processing based on the acquired information about the beacon signal. When the acquisition unit 31 acquires the beacon ID, the RSSI, and the time from the communication terminal 20, the specification unit 32 performs the beacon reception history list update processing.

The specification unit 32 performs the beacon reception history list update processing by using the beacon ID, the RSSI, and the time acquired by the acquisition unit 31 and a beacon reception history list stored in the storage unit 34 to be described later.

The specification unit 32 determines whether or not the beacon signal corresponding to the beacon ID and the RSSI acquired by the acquisition unit 31 is a beacon signal to be determined. When the beacon ID and RSSI of the beacon signal acquired by the acquisition unit 31 is a beacon signal to be determined, the specification unit 32 updates the beacon reception history list.

The beacon reception history list is a list in which the beacon signals received by the communication terminal 20 in the reception history of the beacon signals acquired from the communication terminal 20 by the acquisition unit 31 are managed. A beacon ID, a timestamp, a Raw RSSI, and a corrected RSSI are set in association with each other in the beacon reception history list.

As the beacon ID, a beacon ID of the beacon transmitter that has transmitted the beacon signal received by the communication terminal 20 and acquired by the acquisition unit 31 from the communication terminal 20 is set.

As the timestamp, a time when the beacon signal transmitted from the beacon transmitter to which the beacon ID is assigned is received by the communication terminal 20 and a time acquired by the acquisition unit 31 from the communication terminal 20 are set.

As the Raw RSSI, the RSSI of the beacon signal transmitted from the beacon transmitter to which the beacon ID is assigned that is the RSSI when the communication terminal 20 has received is set.

As the corrected RSSI, the RSSI set as the Raw RSSI is corrected is set.

When the acquisition unit 31 acquires the beacon ID and the RSSI from the communication terminal 20, the specification unit 32 checks the beacon reception history list. The specification unit 32 determines whether or not the beacon signal transmitted from the beacon transmitter having the acquired beacon ID is received within a time period from X seconds (X: an integer of 1 or more) before the current time to the current time, which is a beacon determination time. If the beacon signal transmitted from the beacon transmitter to which the acquired beacon ID is assigned is received within the beacon determination time, the specification unit 32 determines that the beacon signal is a beacon signal to be determined.

If the beacon signal corresponding to the beacon ID acquired by the acquisition unit 31 is a beacon signal to be determined, the specification unit 32 corrects the RSSI acquired by the acquisition unit 31 and calculates the corrected RSSI. Using a median filter, the specification unit 32 calculates a median RSSI of the past several beacon signals transmitted from the beacon transmitter having the acquired beacon ID. The specification unit 32 calculates the RSSI from which large noise is removed by performing calculation by using the median filter. Using a low-pass filter in which an adjusted cutoff frequency, an adjusted time constant, and an adjusted sampling frequency have been set, the specification unit 32 further calculates the corrected RSSI. The specification unit 32 further corrects, by means of the low-pass filter, the RSSI calculated by using the median filter to calculate the RSSI from which fine noise is removed. The specification unit 32 defines the RSSI calculated by using the median filter and the low-pass filter as the corrected RSSI.

The specification unit 32 adds, to the beacon reception history list, information about the beacon signal received by the communication terminal 20 and acquired by the acquisition unit 31 from the communication terminal 20. The specification unit 32 adds the beacon ID, the timestamp, the RSSI, and the calculated RSSI acquired by the acquisition unit 31 to the beacon reception history list and updates the beacon reception history list. The specification unit 32 sets the beacon ID acquired by the acquisition unit 31 as the beacon ID of the beacon reception history list. The specification unit 32 sets the time acquired by the acquisition unit 31 as the timestamp of the beacon reception history list. The specification unit 32 sets the RSSI acquired by the acquisition unit 31 as the Raw RSSI of the beacon reception history list. The specification unit 32 sets the RSSI calculated by using the median filter and the low-pass filter as the corrected RSSI of the beacon reception history list.

<Beacon Group Decision Processing>

After the beacon reception history list update processing, the specification unit 32 performs the beacon group decision processing to decide the beacon group with the strongest RSSI by using the beacon reception history list. In the following descriptions, "beacon group decision processing" is sometimes referred to simply as "decision processing".

Using the beacon reception history list, the specification unit 32 calculates the RSSI for each beacon group and decides the beacon group with the strongest RSSI for each beacon group based on the RSSI for each beacon group.

Figure 5:
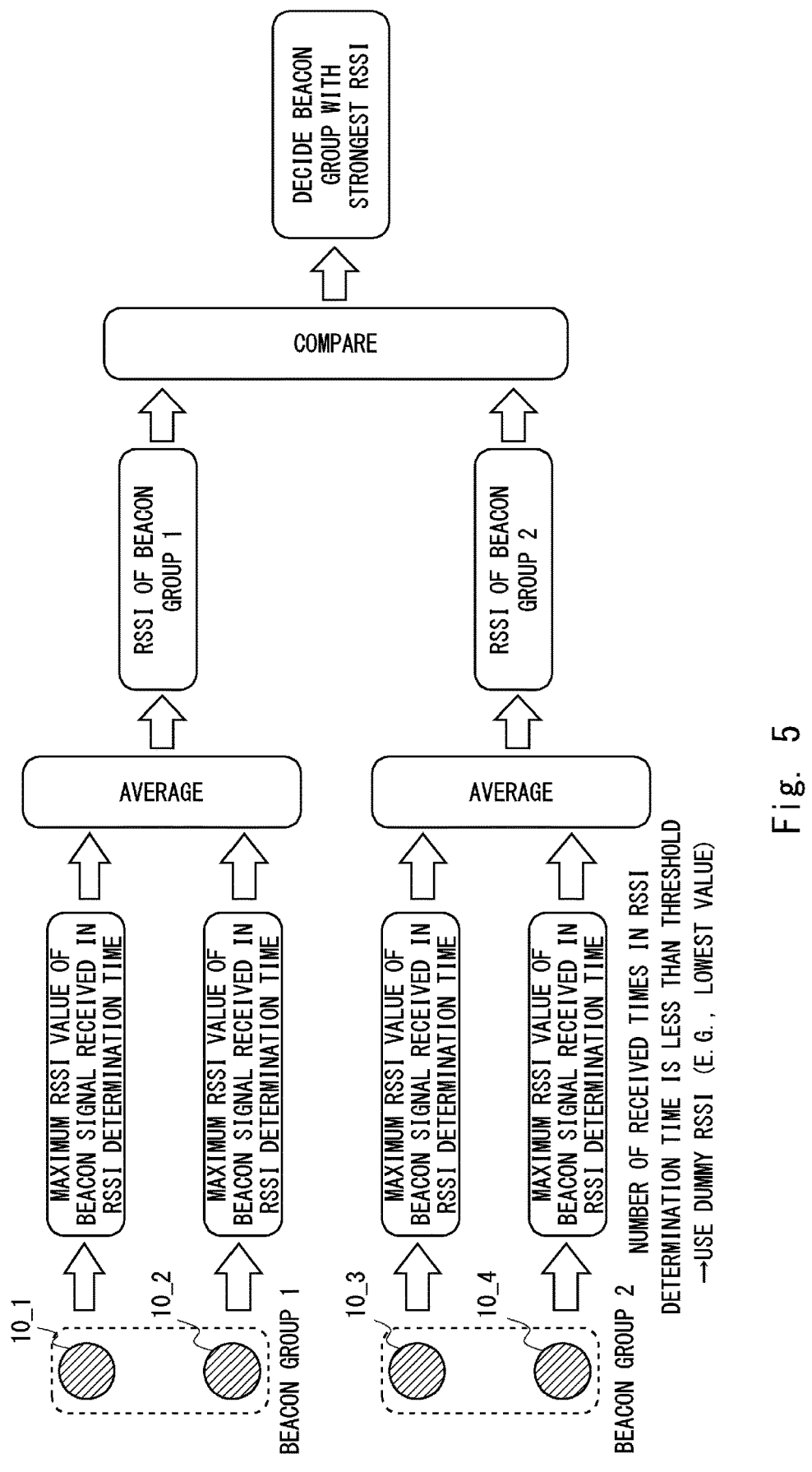
FIG. 5 is a diagram for explaining beacon group decision processing.

Here, the beacon group decision processing is described with reference to FIG. 5. FIG. 5 is a diagram for explaining the beacon group decision processing. In the beacon group decision processing, the specification unit 32 decides the beacon group with the strongest RSSI by performing the processing in order from the left in FIG. 5.

Using the beacon reception history list, the specification unit 32 acquires the RSSI of each beacon transmitter in the RSSI determination time. Specifically, the specification unit 32 acquires, from the beacon reception history list, the beacon ID and the corrected RSSI whose timestamp in the beacon reception history list is included in a time period from Y seconds (Y: an integer of 1 or more) before the current time to the current time, which is the RSSI determination time. The specification unit 32 acquires the maximum value of the corrected RSSI for each beacon ID and decides it as the RSSI of each beacon transmitter. Note that the RSSI determination time may be a time period from (B+Y) seconds before the current time to B seconds (B: a fraction of 0.1 or more) before the current time.

Here, it is also assumed that the beacon signals from all the beacon transmitters are not received continuously by the communication terminal 20 during a time period from Y seconds before the current time to the current time, which is the RSSI determination time. Therefore, the specification unit 32 counts the number of times the beacon signals are received from each beacon transmitter during the time period from Y seconds before the current time to the current time, which is the RSSI determination time. Then, the specification unit 32 sets, as a dummy RSSI value, the value of the RSSI of the beacon transmitter whose number of received times in the RSSI determination time is less than a number of received times threshold.

Specifically, the specification unit 32 acquires, from the beacon reception history list, the beacon ID and the corrected RSSI whose timestamp in the beacon reception history list is included in a time period from Y seconds before the current time to the current time, which is the RSSI determination time. The specification unit 32 counts the number of acquired beacon IDs or the number of acquired corrected RSSIs as the number of times the beacon signal is received. In the RSSI determination time, the specification unit 32 sets, as the dummy RSSI value, the value of the RSSI of the beacon transmitter corresponding to the beacon ID whose number of received times is less than the number of received times threshold. The dummy RSSI value may be the lowest RSSI at which the communication terminal 20 can recognize the beacon signal, or it may be lower than the normally acquired RSSI, for example, −100 dBm.

Next, the specification unit 32 calculates the average RSSI value of the beacon transmitters included in the beacon group for each beacon group, and calculates it as the RSSI for each beacon group. The specification unit 32 compares the RSSIs for the respective beacon groups, and decides the beacon group with the strongest RSSI based on the comparison result. That is, the specification unit 32 decides the beacon group with the strongest RSSI based on the RSSI of the beacon signal received by the communication terminal 20 during a time period from Y seconds before the current time to the current time, which is the RSSI determination time.

Here, it is also assumed that the beacon group with the strongest RSSI may be a beacon group arranged in an area far from the area where the communication terminal 20 is actually arranged. Therefore, the specification unit 32 determines whether or not the RSSI of the beacon group with the strongest RSSI is a RSSI threshold or more. If the RSSI of the beacon group with the strongest RSSI is the RSSI threshold or more, the specification unit 32 confirms the decided beacon group as the beacon group with the strongest RSSI. When the specification unit 32 decides the beacon group with the strongest RSSI, it updates the beacon group history list.

The beacon group history list is a list in which the beacon groups with the strongest RSSI are managed as a history. In the beacon group history list, the beacon group, the initial timestamp, and the latest timestamp are set in association with each other.

If the beacon group with the strongest RSSI decided by the specification unit 32 is different from the beacon group decided in the last decision processing, information specifying the beacon group decided by the specification unit 32 is set in the beacon group. The information specifying the beacon group may be the number of the beacon group or an ID specifying the beacon group.

When the beacon group with the strongest RSSI decided by the specification unit 32 is different from the beacon group decided in the last decision processing, a time when the beacon group decision processing is performed is set as the initial timestamp.

When the beacon group with the strongest RSSI decided by the specification unit 32 is the same as the beacon group decided in the last decision processing, a time when the decision processing is performed is set as the latest timestamp.

If the decided beacon group is different from the beacon group decided in the last decision processing, the specification unit 32 sets the decided beacon group as the beacon group in the beacon group history list. Furthermore, the specification unit 32 sets the time when the decision processing is performed as the initial timestamp of the beacon group history list. On the other hand, when the decided beacon group is the same as the beacon group decided in the last decision processing, the specification unit 32 sets the time when the decision processing is performed as the latest timestamp of the beacon group history list.

<Area Determination Processing>

The specification unit 32 uses the beacon group history list to determine the area where the user U is present and performs determination processing to specify the area movement history. The specification unit 32 may perform the area determination processing asynchronously with the beacon reception history list update processing and the beacon group decision processing. Alternatively, the specification unit 32 may perform the area determination processing synchronously with the beacon reception history list update processing and the beacon group decision processing.

Figure 6:
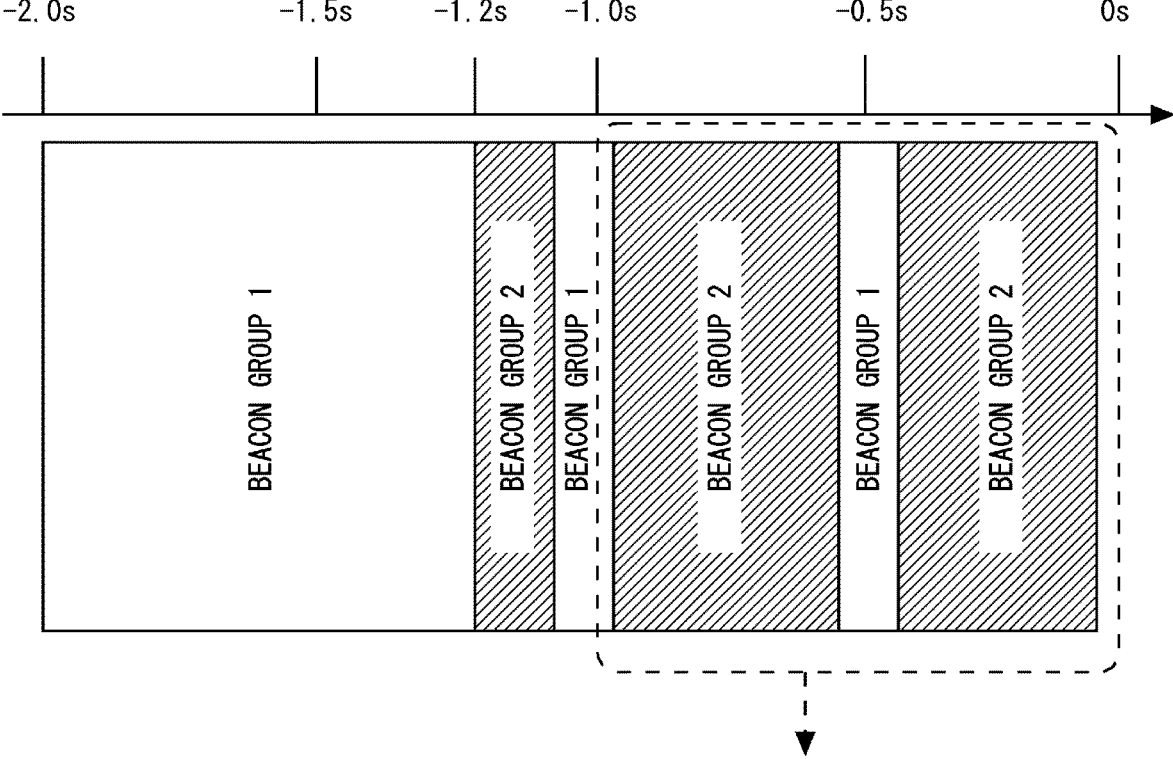
FIG. 6 is a diagram for explaining area determination processing.

The area determination processing will be described with reference to FIG. 6. FIG. 6 is a diagram for explaining the area determination processing. The specification unit 32 creates a time chart as shown in FIG. 6 based on the beacon group, the initial timestamp, and the latest timestamp in the beacon group history list. For example, assume that the beacon group 1 is set as the beacon group in the beacon group history list, the time 2 seconds before the current time is set as the initial timestamp, and the time 1.2 seconds before the current time is set as the latest timestamp. In this case, the specification unit 32 sets the beacon group 1 at a time between 2 seconds before (−2.0 s) the current time (0 s) and 1.2 seconds (−1.2 s) before the current time as shown in FIG. 6. In this way, the specification unit 32 creates the time chart shown in FIG. 6 based on the beacon group history list.

The specification unit 32 calculates how much time each beacon group occupies in the group determination time by using the time from Z seconds (Z: an integer of 1 or more) before the current time to the current time as the group determination time. The specification unit 32 decides the beacon group in which the ratio of the calculation time to the group determination time exceeds a threshold. The specification unit 32 specifies the area corresponding to the decided beacon group as the area where the user U is present. Note that the determination time may be the time from (C+Z) seconds before the current time to C seconds (C: a fraction of 0.1 or more) before the current time.

In the example shown in FIG. 6, when the group determination time is 1 second and the threshold is set at 80%, the time occupied by the beacon group 2 exceeds the threshold of 80% with respect to the group determination time surrounded by the dotted line. Thus, the specification unit 32 specifies the area 2 corresponding to the beacon group 2 as the area where user U is present.

Here, the time between the initial timestamp and the latest timestamp can be said to be a duration time until the beacon group with the strongest RSSI for each beacon group is changed. Therefore, it can be said that the specification unit 32 decides the area where the user U is present based on the duration time, which can also be explained as follows. Based on the initial timestamp and the latest timestamp in the beacon group history list, the specification unit 32 calculates the duration time until the beacon group with the strongest RSSI for each beacon group is changed. For each beacon group determined as the beacon group with the strongest RSSI, the specification unit 32 calculates the total duration time in a time period Z seconds before the current time to the current time, which is the group determination time. The specification unit 32 decides the beacon group whose ratio of the total duration time to the group determination time exceeds the threshold. The specification unit 32 specifies the area corresponding to the decided beacon group as the area where the user U using the communication terminal 20 is present.

It can also be said that the ratio of the total time to the group determination time indicates the stability of the beacon group with the strongest RSSI. Therefore, the ratio of the total time to the group determination time may be referred to as the stability. In addition, the group determination time may be referred to as a stability determination time, because it can also be referred to as the time for determining the stability. Furthermore, the above threshold may be referred to as a stability threshold, because it is the threshold for determining the stability. That is, it can also be said that the specification unit 32 calculates the stability of each beacon group in the stability determination time based on the beacon group history list, and specifies the area where the user U is present based on the stability and a stability threshold. In the following descriptions, in some cases, the group determination time is described as the stability determination time, the ratio of the total time to the stability determination time is described as the stability, and the above threshold is described as the stability threshold.

Returning to FIG. 3, the description of the specification unit 32 is continued. When the specification unit 32 specifies the area where the user U using the communication terminal 20 is present, it specifies the area movement history based on the specified area. Using the area movement history list described later, the specification unit 32 specifies the area movement history of the user U using the communication terminal 20. The area movement history list is a list that manages the area where the user U using the communication terminal 20 is present or the area where the user U was present.

The specification unit 32 compares the area where the user U using the communication terminal 20 before performing the area determination processing is present with the area specified by performing the area determination processing. That is, the specification unit 32 compares the area before and after the area determination processing. When the two areas do not match, the specification unit 32 determines that the user U using the communication terminal 20 has moved the area, adds the area where the user U has moved to the area movement history list, and updates the area movement history list. The specification unit 32 specifies the area movement history of the user U using the communication terminal 20 by checking the order of addition of the area set in the area movement history list.

The specification unit 32 may not use the area movement history list and specify the area movement history by keeping the area before the move and the area after the move when the user U using the communication terminal 20 has moved the area.

The control unit 33 also functions as a communication unit and connects and communicates with the communication terminal 20 via the network N. Based on the area specified by the specification unit 32 where the user U using the communication terminal 20 is present and the area movement history, the control unit 33 decides whether or not to provide a service to the communication terminal 20. Based on the area movement history, the control unit 33 decides a direction in which the user U using the communication terminal 20 moves (the direction is hereinafter referred to as a movement direction). Based on the decided movement direction and the area where the user U using the communication terminal 20 is present, the control unit 33 decides whether or not to provide a service to the communication terminal 20. When the control unit 33 decides to provide a service to the communication terminal 20, it provides a service corresponding to the movement direction to the communication terminal 20. The service provided to the communication terminal 20 may be a voice service, an advertising service, a video service, a dialogue service such as a chatbot, an electronic stamp, etc.

Figure 7:
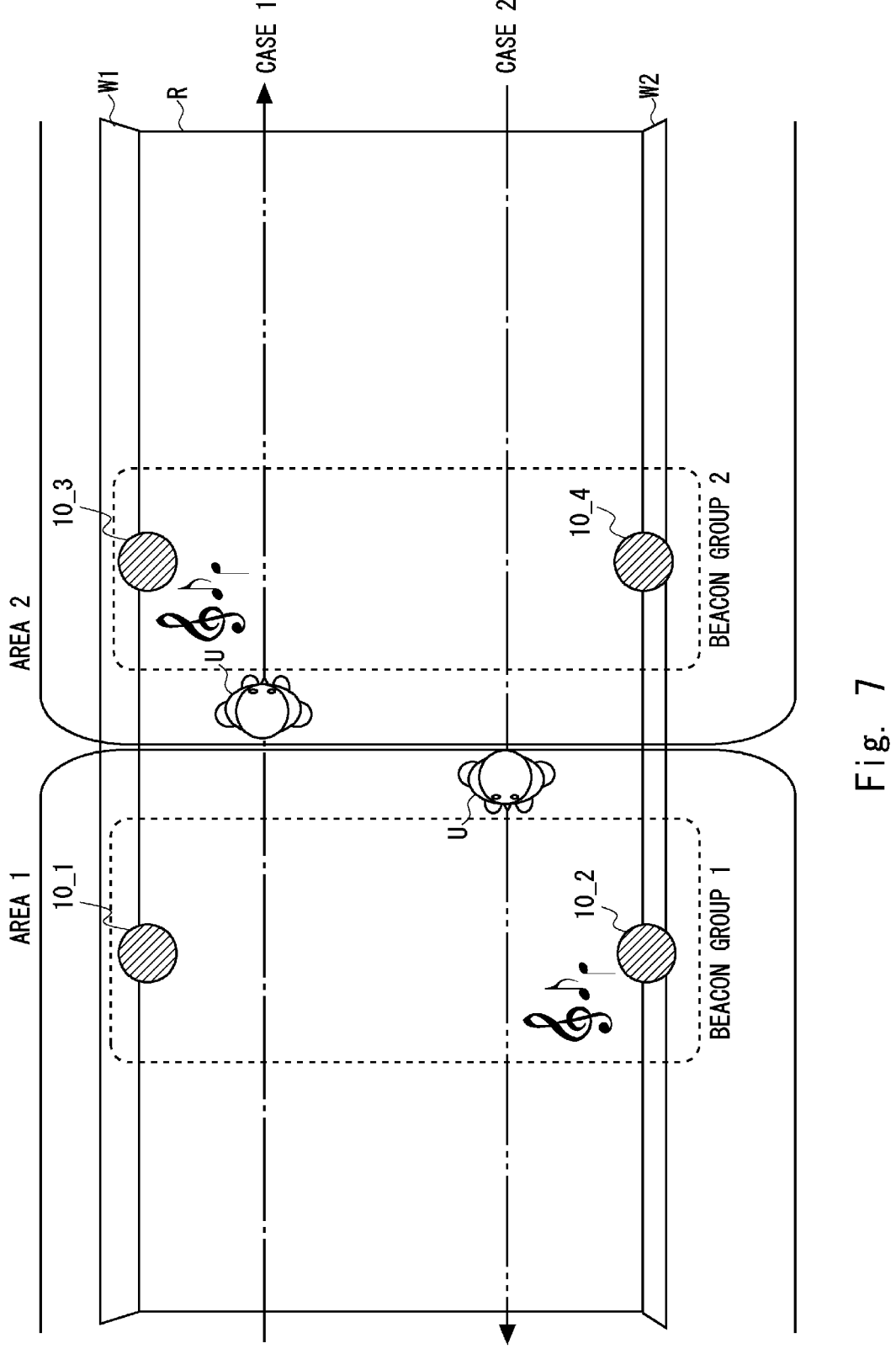
FIG. 7 is a diagram for explaining service provision processing.

Here, service provision processing performed by the control unit 33 is described with reference to FIG. 7. FIG. 7 is a diagram for explaining the service provision processing. FIG. 7 corresponds to FIG. 4 and shows the route R when viewed vertically above. FIG. 7 shows a case 1 indicating that the user U using the communication terminal 20 is moving from the area 1 to the area 2 and a case 2 indicating that the user U is moving from the area 2 to the area 1. In FIG. 7, the communication terminal 20 is not shown.

<Case 1>

For example, it is assumed that a condition is defined to provide a voice service when the movement direction is from the area 1 to the area 2 and when the user U is present in the area 2. In this case, when the user U using the communication terminal 20 is specified as being present in the area 2 and when the movement direction of the user U is specified as being from the area 1 to the area 2 based on the area movement history, the control unit 33 decides to provide a service to the user U. The control unit 33 provides a voice service that meets the above condition of the case 1.

<Case 2>

For example, it is assumed that a condition is defined to provide a voice service when the movement direction is from the area 2 to the area 1 and when the user U is present in the area 1. In this case, when the user U using the communication terminal 20 is specified as being present in the area 1 and when the movement direction of the user U is specified from the area 2 to the area 1 based on the area movement history, the control unit 33 decides to provide a service to the user U. The control unit 33 provides a voice service that meets the above condition of the case 2.

Although the conditions for providing services have been described in the cases 1 and 2, the conditions used in the case 1 or case 2 may be the conditions for deciding not to provide a service. In the case 1 and case 2, it has been described that the voice service is provided, but for example, services different from the voice service such as a video service may be provided. Furthermore, different services may be provided in the case 1 and the case 2, or the same service may be provided in the case 1 and the case 2.

Returning to FIG. 3, the description of the control unit 33 is continued. The control unit 33 uses, for example, a service provision determination table T1 to determine whether to provide a service and to decide a service to be provided.

Here, an example of the service provision determination table T1 will be described with reference to FIG. 8. FIG. 8 shows an example of the service provision determination table. In the example shown in FIG. 8, the service provision determination table T1 is set with a target area, a movement direction, whether or not to provide a service (hereinafter referred to as provision of service), and a provided service.

An area where the control of whether or not to provide a service is triggered is set as the target area.

A movement direction in which the control of whether or not to provide a service is triggered is set as the movement direction. Furthermore, a movement direction related to the service provided is set as the movement direction.

When the target area and the movement direction of the service provision determination table T1 match the area where the user U is present and the movement direction of the user U, respectively, information for the control unit 33 to decide whether or not to provide a service is set as the provision of service. When "Yes" is set for the provision of service, and when the target area and the movement direction of the service provision determination table T1 match the area where the user U is present and the movement direction of the user U, respectively, the control unit 33 decides to provide a service. In the case where "No" is set for the provision of service, if the target area and the movement direction of the service provision determination table T1 match the area where the user U is present and the movement direction of the user U, respectively, the control unit 33 decides not to provide a service.

When the service is provided, the service provided to the communication terminal 20 used by the user U is set for the provided service. If the provision of service is "No", information indicating that there is no provided service may be set.

The control unit 33 determines whether the area where the user U using the communication terminal 20 is present is included in the target area of the service provision determination table T1 by searching the target area of the service provision determination table T1. When the area matching the area where the user U is present is set as the target area of the service provision determination table T1, the control unit 33 searches whether the movement direction matching the decided movement direction is set as the movement direction of the service provision determination table T1. When the movement direction matching the decided movement direction is set as the movement direction of the service provision determination table T1, the control unit 33 checks the provision of service in the service provision determination table T1, and decides whether or not to provide a service. When "Yes" is set in the provision of service in the service provision determination table T1, the control unit 33 decides to provide a service. When "No" is set in the provision of service in the service provision determination table T1, the control unit 33 decides not to provide a service. When the control unit 33 decides to provide a service, it provides the service set as the provided service in the service provision determination table T1 to the communication terminal 20.

The storage unit 34 stores the beacon reception history list, the beacon group history list, the area movement history list, and the service provision determination table T1. The storage unit 34 also stores contents corresponding to services that can be provided to the communication terminal 20.

<Operation Example of Server Apparatus>

Next, an operation example of the server apparatus 30 according to the second example embodiment will be described with reference to FIGS. 9 to 12. FIGS. 9 to 12 are flowcharts showing an operation example of the server apparatus according to the second example embodiment.

Figure 9:
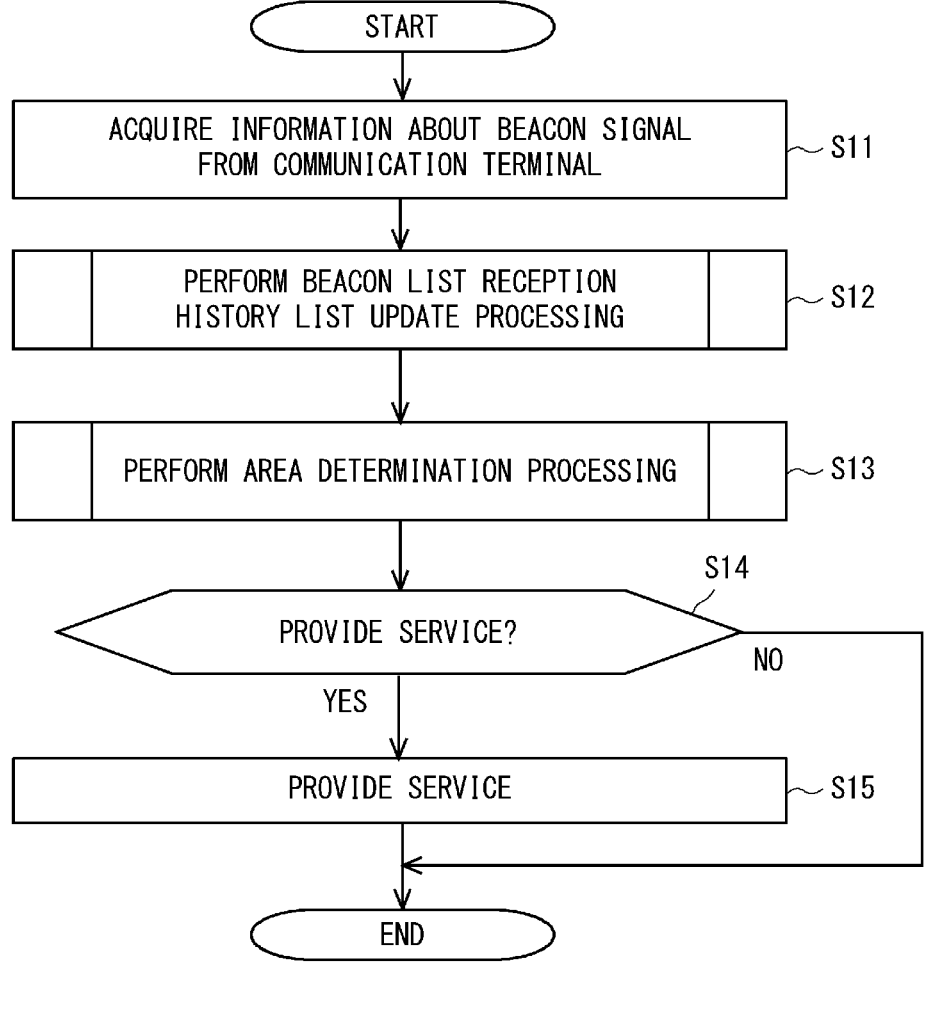
FIG. 9 is a flowchart showing an operation example of a server apparatus according to the second example embodiment.

First, an overall operation of the server apparatus 30 is described with reference to FIG. 9. FIG. 9 is executed when the communication terminal 20 receives a beacon signal from any of the beacon transmitters 10_1 to 10_N.

The acquisition unit 31 acquires information about the beacon signal received by the communication terminal 20 from the communication terminal 20 (Step S11). The acquisition unit 31 acquires, from the communication terminal 20, the RSSI of the beacon signal at the communication terminal 20 received by the communication terminal 20 and transmitted from at least one of the beacon transmitters 10_1 to 10_N. The acquisition unit 31 acquires, from the communication terminal 20, the beacon ID received by the communication terminal 20 and identifying the beacon transmitter of the beacon signal transmitted from at least one beacon transmitter. The acquisition unit 31 acquires, from the communication terminal 20, the time when the communication terminal 20 has received the beacon signal.

The specification unit 32 performs the beacon reception history list update processing (Step S12) and the area determination processing (Step S13). By performing the area determination processing, the specification unit 32 specifies the area where the user U using the communication terminal 20 is present, and specifies the area movement history based on the area where the user U is present. Detailed operation examples of the beacon reception history list update processing and the area determination processing will be described later.

Although the area determination processing is described in FIG. 9 as being executed after the beacon reception history list update processing, the area determination processing needs not be executed after the beacon reception history list update processing. In other words, the area determination processing may be executed asynchronously with the beacon reception history list update processing.

Based on the area where the user U using the communication terminal 20 is present and the area movement history, the control unit 33 determines whether or not to provide a service to the communication terminal 20 (Step S14). Based on the area movement history, the control unit 33 decides the movement direction of the user U using the communication terminal 20. Based on the decided movement direction and the area where the user U using the communication terminal 20 is present, the control unit 33 decides whether or not to provide a service to the communication terminal 20.

When a service is to be provided to the communication terminal 20 (YES in Step S14), the control unit 33 provides the service corresponding to the movement direction to the communication terminal 20 (Step S15).

On the other hand, when a service is not to be provided to the communication terminal 20 (NO in Step S14), the control unit 33 ends the operation.

Figure 10:
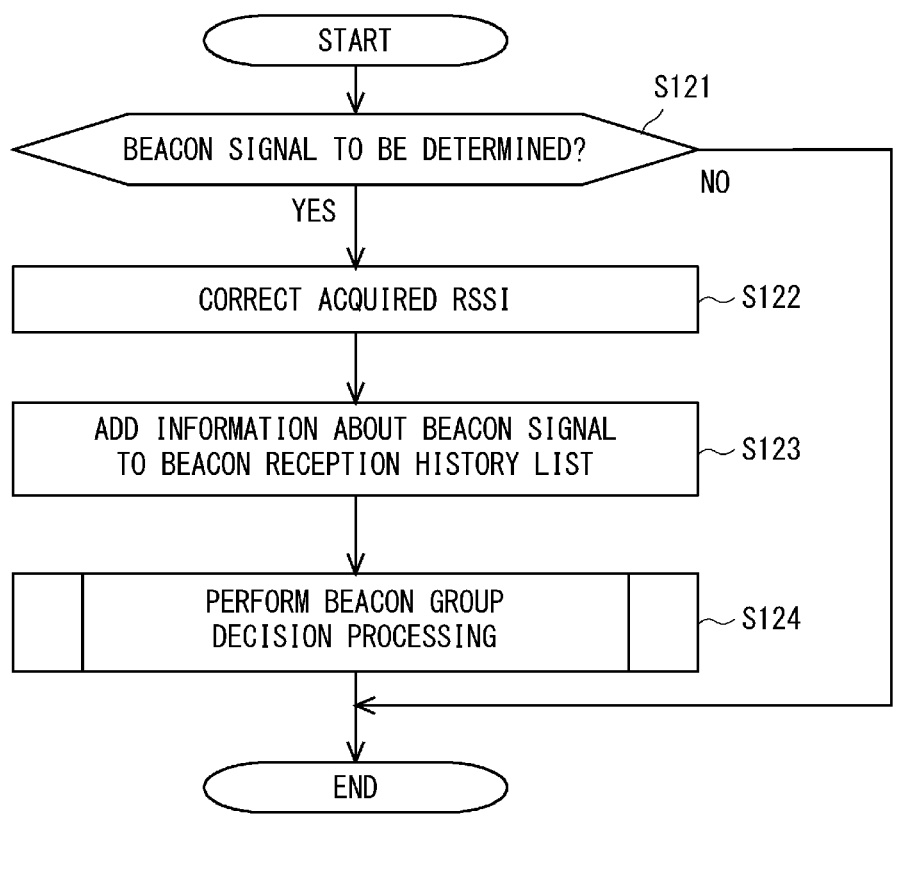
FIG. 10 is a flowchart showing an example of an operation of the server apparatus according to the second example embodiment.

Next, the beacon reception history list update processing executed in Step S12 of FIG. 9 will be described with reference to FIG. 10. The specification unit 32 performs the beacon reception history list update processing based on the information about the beacon signal received by the communication terminal 20.

The specification unit 32 determines whether the beacon signal corresponding to the beacon ID and the RSSI acquired by the acquisition unit 31 is a beacon signal to be determined (Step S121). When the acquisition unit 31 acquires the beacon ID and the RSSI from the communication terminal 20, the specification unit 32 checks the beacon reception history list and determines whether the beacon signal transmitted from the beacon transmitter having the acquired beacon ID is received in the beacon determination time.

When the specification unit 32 determines that the beacon signal is a beacon signal to be determined (YES in Step S121), the specification unit 32 corrects the RSSI acquired by the acquisition unit 31 (Step S122). When the beacon signal transmitted from the beacon transmitter to which the acquired beacon ID is assigned has been received in the beacon determination time, the specification unit 32 determines that the beacon signal is a beacon signal to be determined. When the beacon signal corresponding to the beacon ID acquired by the acquisition unit 31 is a beacon signal to be determined, the specification unit 32 corrects the RSSI acquired by the acquisition unit 31 by using a median filter and a low-pass filter.

The specification unit 32 adds information about the beacon signal received by the communication terminal 20 and acquired by the acquisition unit 31 from the communication terminal 20 to the beacon reception history list (Step S123). The specification unit 32 sets the beacon ID acquired by the acquisition unit 31 to the beacon ID of the beacon reception history list. The specification unit 32 sets the time acquired by the acquisition unit 31 as the timestamp of the beacon reception history list. The specification unit 32 sets the RSSI acquired by the acquisition unit 31 as the raw RSSI of the beacon reception history list. The specification unit 32 sets the RSSI calculated by using the median filter and the low-pass filter as the corrected RSSI of the beacon reception history list.

The specification unit 32 uses the beacon reception history list to perform the beacon group decision processing for deciding the beacon group with the strongest RSSI (Step S124).

On the other hand, when the specification unit 32 does not determine that the beacon signal is a beacon signal to be determined (NO in Step S121), the server apparatus 30 ends the operation.

Figure 11:
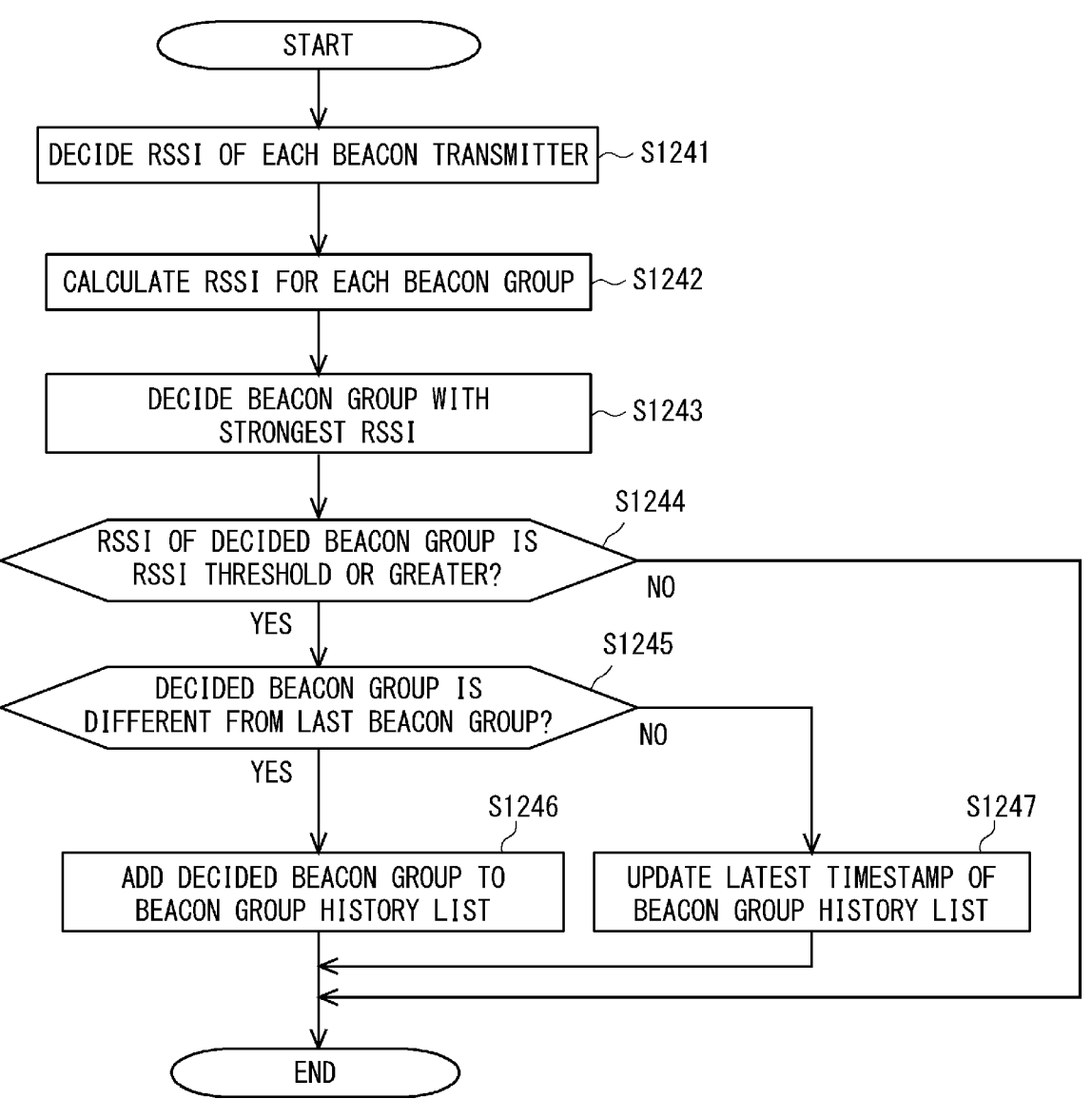
FIG. 11 is a flowchart showing an example of the operation of the server apparatus according to the second example embodiment.

Next, the beacon group decision processing performed in Step S124 of FIG. 10 will be described with reference to FIG. 11.

Using the beacon reception history list, the specification unit 32 acquires the RSSI of each beacon transmitter in the RSSI determination time and decides the RSSI of each beacon transmitter (Step S1241).

The specification unit 32 acquires, from the beacon reception history list, the beacon ID and the corrected RSSI whose timestamp in the beacon reception history list is included in a time period from Y seconds before the current time to the current time, which is the RSSI determination time. The specification unit 32 acquires the maximum value of the corrected RSSI for each beacon ID and decides it as the RSSI of each beacon transmitter. Further, the specification unit 32 counts the number of times the beacon signals are received from each beacon transmitter during the time period from Y seconds before the current time to the current time, which is the RSSI determination time. The specification unit 32 sets the value of the RSSI of the beacon transmitter whose number of received times in the RSSI determination time is less than the number of received times threshold as the dummy RSSI value.

The specification unit 32 calculates the RSSI of the beacon group based on the RSSI of each beacon transmitter (Step S1242). The specification unit 32 calculates the average value of the RSSIs of the beacon transmitters included in the beacon group for each beacon group, and calculates it as the RSSI for each beacon group.

The specification unit 32 decides the beacon group with the strongest RSSI (Step S1243). The specification unit 32 compares the RSSIs of the respective beacon groups and decides the beacon group with the strongest RSSI based on the comparison result.

The specification unit 32 determines whether the RSSI of each beacon group decided in Step S1243 is greater than or equal to the RSSI threshold (Step S1244).

If the RSSI of the beacon group with the strongest RSSI is less than the RSSI threshold (NO in Step S1244), the server apparatus 30 ends the operation.

On the other hand, if the RSSI of the beacon group with the strongest RSSI is greater than or equal to the RSSI threshold (YES in Step S1244), the specification unit 32 determines whether or not the decided beacon group is different from the beacon group decided last time (Step S1245). The specification unit 32 determines whether or not the decided beacon group is different from the beacon group decided in the last beacon group decision processing.

If the decided beacon group is different from the last decided beacon group (YES in Step S1245), the specification unit 32 adds the decided beacon group to the beacon group history list (Step S1246). If the decided beacon group is different from the beacon group decided in the last decision processing, the specification unit 32 sets the decided beacon group as the beacon group in the beacon group history list. Furthermore, the specification unit 32 sets the time when the decision processing is performed as the initial timestamp of the beacon group history list.

On the other hand, if the decided beacon group is the same as the last decided beacon group (NO in Step S1245), the specification unit 32 updates the latest timestamp of the beacon group history list (Step S1247). If the decided beacon group is the same as the beacon group decided in the last decision processing, the specification unit 32 sets the time when the decision processing is performed as the latest timestamp of the beacon group history list.

Figure 12:
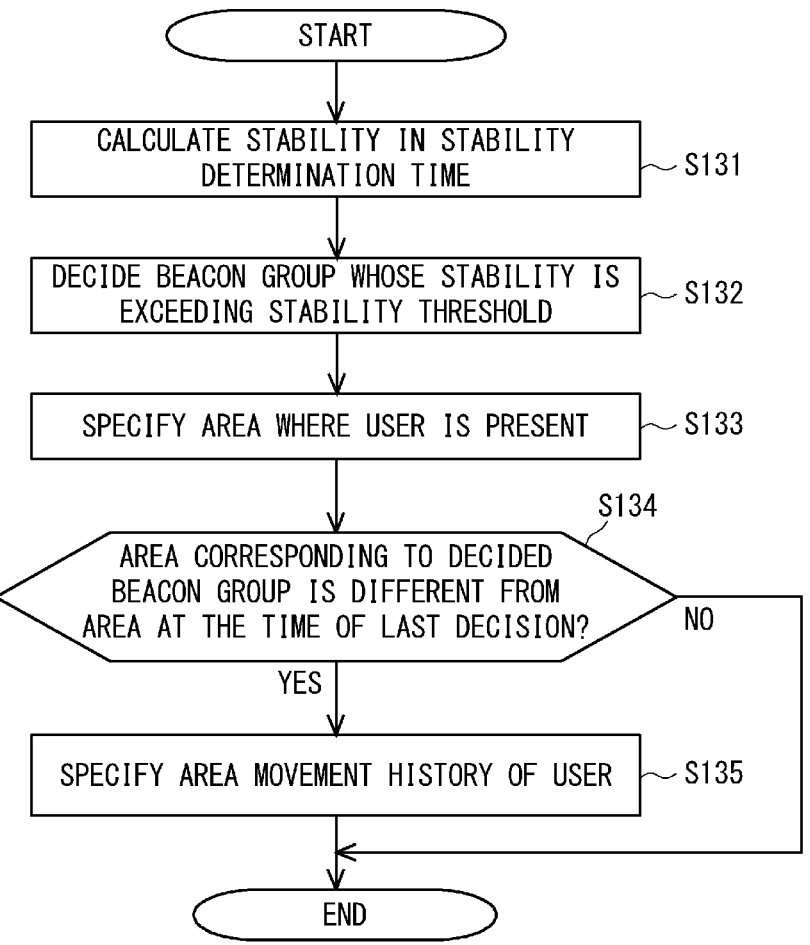
FIG. 12 is a flowchart showing an example of the operation of the server apparatus according to the second example embodiment.

Next, the area determination processing executed in Step S13 of FIG. 9 is described with reference to FIG. 12. The area determination processing may be performed asynchronously or periodically with the beacon reception history list update processing.

The specification unit 32 calculates the stability of each beacon group in the stability determination time (Step S131). Based on the initial timestamp and the latest timestamp in the beacon group history list, the specification unit 32 calculates the duration time until the beacon group with the strongest RSSI for each beacon group is changed. For each beacon group determined as the beacon group with the strongest RSSI, the specification unit 32 calculates the total duration time in the stability determination time. The specification unit 32 calculates the ratio of the total time to the stability determination time as the stability of each beacon group in the stability determination time.

The specification unit 32 decides the beacon group whose calculated stability exceeds the stability threshold (Step S132). The specification unit 32 compares the calculated stability with the stability threshold and decides the beacon group whose stability exceeds the stability threshold.

The specification unit 32 specifies the area where the user U is present based on the decided beacon group (Step S133). The specification unit 32 specifies the area where the decided beacon group is to be arranged, and specifies the specified area as the area where the user U using the communication terminal 20 is present.

The specification unit 32 determines whether or not the area corresponding to the decided beacon group is different from the area at the time of the last decision (Step S134). The specification unit 32 specifies the area where the decided beacon group is arranged, and determines whether or not the area is different from the area where the beacon group decided in the area determination processing performed last time.

When the area corresponding to the decided beacon group is different from the area at the time of the last decision (YES in Step S134), the specification unit 32 specifies the area movement history of the user (Step S135). When the area corresponding to the decided beacon group is different from the area at the time of the last decision, the specification unit 32 adds the area specified in Step S132 to the area movement history list. Based on the area movement history list, the specification unit 32 specifies the area movement history of the user U using the communication terminal 20.

On the other hand, when the area corresponding to the decided beacon group is the same as the area at the time of the last decision (NO in Step S134), the server apparatus 30 ends the area determination processing.

As described above, the server apparatus 30 specifies the area where the user U using the communication terminal 20 is present based on the information about the beacon signal received by the communication terminal 20. When the specified area is different from the area specified in the last area determination processing, the server apparatus 30 updates the area movement history and specifies the area movement history of the user U using the communication terminal 20. The server apparatus 30 decides whether or not to provide a service based on the area where the user U is present and the area movement history. The area movement history can also be said to be information indicating the movement state of the user. Therefore, according to the server apparatus 30 of the second example embodiment, services can be provided according to not only the location of the user but also the movement state of the user.

Also, the server apparatus 30 decides the movement direction of the user U based on the area movement history, decides the service to be provided when the service is provided based on the area where the user U is present and the movement direction of the user U, and provides the decided service to the communication terminal 20. Therefore, according to the server apparatus 30 of the second example embodiment, the service according to the movement state of the user can be provided.

First Modified Example

In the second example embodiment, the control unit 33 has been described that a service is provided according to the location of the user U using the communication terminal 20 and the movement direction of the user U, but the service may also be provided taking into consideration the state of the route R. If the control unit 33 provides a service when the user U moves from the area 1 to the area 2, and the route R branches toward the movement direction of the user U, the control unit 33 may provide a service to the communication terminal 20 when the route R branches. In this case, the control unit 33 can achieve this by retaining information about a candidate area that the user U can move toward the movement direction of the user U. In this way, the server apparatus 30 can provide services taking into consideration not only the movement state of the user but also the state of the route R. In other words, the server apparatus 30 can provide services taking into consideration not only the movement state of the user but also the state of the area where the user is present.

Second Modified Example

In the second example embodiment, the control unit 33 has been described that a service is provided according to the location of the user U using the communication terminal 20 and the movement direction of the user U, but the service may also be provided according to the area where the user U has moved. Specifically, the control unit 33 may specify the area where the user U using the communication terminal 20 has moved based on the area movement history list, and change the service according to the combination of areas before and after the user U moves.

For example, if the service is provided when the user U is in the area 1, the control unit 33 specifies that the user U is in the area 1. Furthermore, the control unit 33 also specifies the area where the user U was present before the area 1 based on the area movement history list. The control unit 33 may provide a first service if the user U1 was in the area 2 before the area 1 and provide a second service if the user U was in the area 3 before the area 1. In this way, the control unit 33 may provide the service according to the combination of areas where the user U has moved as well as the location where the user U using the communication terminal 20 is present. In this way, the server apparatus 30 can provide the service taking into consideration the movement state of the user U more than in second example embodiment.

Third Modified Example

In the second example embodiment, the control unit 33 decides whether or not to provide a service and a service to provide based on the area where the user U is present and the movement direction. The control unit 33 may decide whether or not to provide a service and a service to provide based on the area where the user U is present and the area movement history without deciding the movement direction of the user U. For example, the control unit 33 may provide the first service when the user U moves in the order of the area 1, the area 2, and the area 3, and the control unit 33 may provide the second service when the user U moves in the order of the area 1, the area 3, and the area 2. This can be implemented by replacing the movement direction of the service availability determination table T1 shown in FIG. 8 with the area movement history. In this way, by using the area movement history for the condition of whether or not a service is provided, the server apparatus 30 can provide the service taking more into consideration the movement state of the user U than in the second example embodiment, and a service provided to the communication terminal 20 can be set more flexibly.

Third Example Embodiment

Next, a third example embodiment will be described. In the second example embodiment, the server apparatus 30 decides whether or not to provide a service to the communication terminal 20. In this example embodiment, the communication terminal decides whether or not to provide a service to the communication terminal. Since the third example embodiment is basically the same as the second example embodiment, common descriptions are omitted where appropriate. The first to third modified examples of the second example embodiment may be applied to this example embodiment.

<Configuration Example of Service Provision System>

Figure 13:
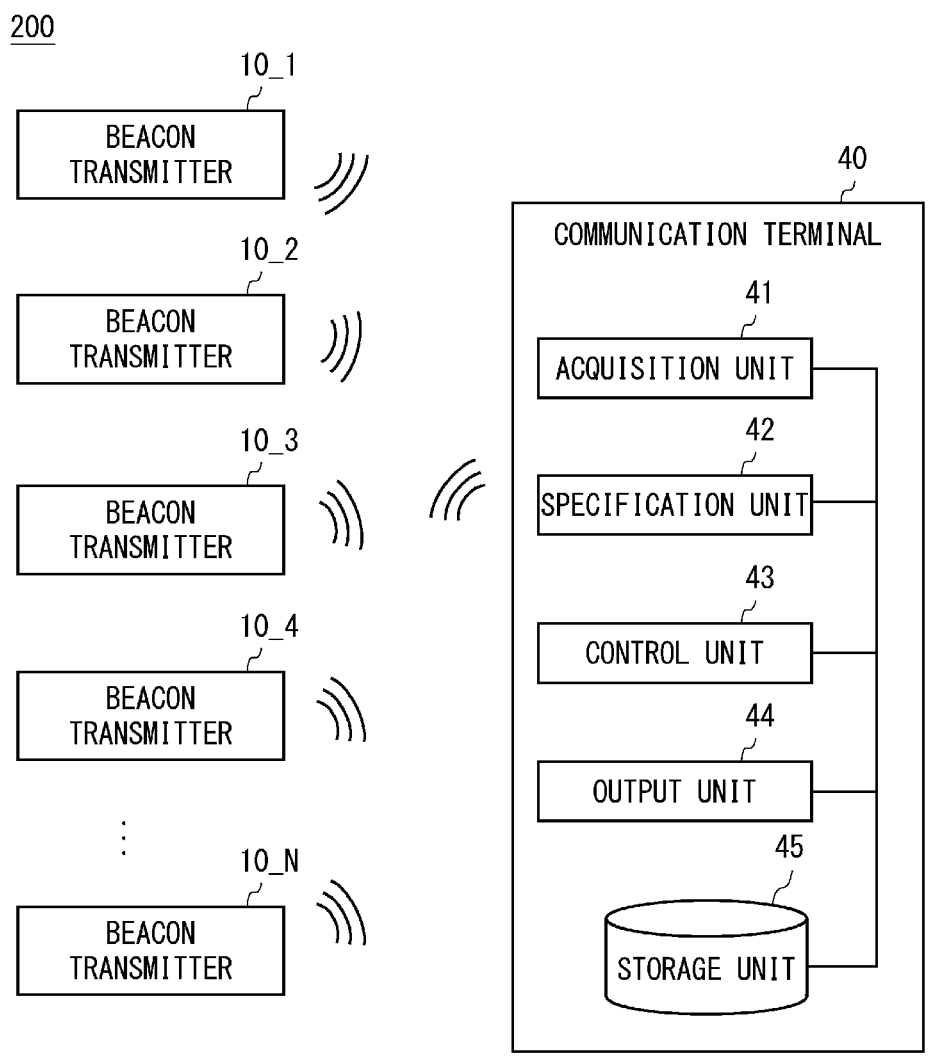
FIG. 13 shows an example of a configuration of a service provision system according to a third example embodiment.

A configuration example of a service provision system 200 according to the third example embodiment will be described with reference to FIG. 13. FIG. 13 shows a configuration example of the service provision system 200 according to the third example embodiment. The service provision system 200 includes beacon transmitters 10_1 to 10_N and a communication terminal 40.

The service provision system 200 has a configuration in which the communication terminal 20 according to the second example embodiment is replaced with the communication terminal 40. The service provision system 200 has a configuration in which the server apparatus 30 according to the second example embodiment is not included, and the communication terminal 40 has a configuration included in the server apparatus 30 according to the second example embodiment. Since the configuration of the beacon transmitters 10_1 to 10_N is the same as that according to the second example embodiment, a description thereof is omitted.

<Configuration Example of Communication Terminal>

Next, a configuration example of the communication terminal 40 will be described. The communication terminal 40 includes an acquisition unit 41, a specification unit 42, a control unit 43, an output unit 44, and a storage unit 45.

The acquisition unit 41 is also configured as a reception unit that receives beacon signals and is configured to be capable of receiving the beacon signals transmitted from the beacon transmitters 10_1 to 10_N. The acquisition unit 41 receives the beacon signal transmitted from at least one of the beacon transmitters 10_1 to 10_N and acquires the beacon ID and the RSSI. The acquisition unit 41 also acquires the time when the beacon signal is received.

The specification unit 42 corresponds to the specification unit 32 according to the second example embodiment. The specification unit 42 has the same configuration as that of the specification unit 32 according to the second example embodiment and executes the processing performed by the specification unit 32 according to the second example embodiment.

The control unit 43 corresponds to the control unit 33 according to the second example embodiment. The control unit 43 has the same configuration as that of the control unit 33 according to the second example embodiment, and executes the processing performed by the control unit 33 according to the second example embodiment.

Based on the area where the user U using the communication terminal 40 is present and the area movement history, the control unit 43 decides whether or not to provide a service to the communication terminal 40.

Based on the area movement history, the control unit 43 decides the movement direction of the user U using the communication terminal 40. Based on the decided movement direction and the area where the user U using the communication terminal 40 is present, the control unit 43 decides whether or not to provide a service to the communication terminal 40. When the control unit 43 decides to provide a service to the communication terminal 40, it outputs the service corresponding to the movement direction to the output unit 44.

The output unit 44 is configured to include an output apparatus such as, a display, a speaker, etc. The output unit 44 outputs the service to the output apparatus according to the service output from the control unit 43. The output unit 44 may be configured to include an input apparatus such as a microphone, and when the service provided by the control unit 43 is a dialogue service, the user's voice using the communication terminal 40 may be input to implement the dialogue service.

The storage unit 45 corresponds to the storage unit 34 according to the second example embodiment. The storage unit 45 stores the beacon reception history list, the beacon group history list, the area movement history list, and the service provision determination table T1. The storage unit 45 also stores contents corresponding to services that can be provided to the communication terminal 40.

<Operation Example of Communication Terminal>

Next, an operation example of the communication terminal 40 will be described. The operation of the communication terminal 40 is basically the same as that of the server apparatus 30 according to the second example embodiment, and the operation shown in FIG. 9 is partly different from that of the server apparatus 30 according to the second example embodiment. Thus, an operation example performed by the communication terminal 40 will be described with reference to FIG. 9.

The acquisition unit 41 acquires information about the beacon signal transmitted from at least one of the beacon transmitters 10_1 to 10_N (Step S11). The acquisition unit 41 receives the beacon signal transmitted from at least one of the beacon transmitters 10_1 to 10_N and acquires the beacon ID and the RSSI from the received beacon signal. The acquisition unit 41 acquires the time when the beacon signal is received.

The specification unit 42 performs the beacon reception history list update processing (Step S12) and the area determination processing (Step S13).

Based on the area where the user U using the communication terminal 40 is present and the area movement history, the control unit 43 determines whether or not to provide a service to the communication terminal 40 (Step S14). Based on the area movement history, the control unit 43 decides the movement direction of the user U using the communication terminal 40. Based on the decided movement direction and the area where the user U using the communication terminal 40 is present, the control unit 43 decides whether or not to provide a service to the communication terminal 40.

When a service is to be provided to the communication terminal 40 (YES in Step S14), the control unit 43 outputs the service corresponding to the movement direction to the output unit 44 (Step S15).

On the other hand, when the control unit 43 does not provide a service to the communication terminal 40 (NO in Step S14), the communication terminal 40 ends its operation.

In this way, the same effect as that of the second example embodiment can be achieved even if the communication terminal 40 includes the configuration included in the server apparatus 30 according to the second example embodiment.

Other Example Embodiments

Figure 14:
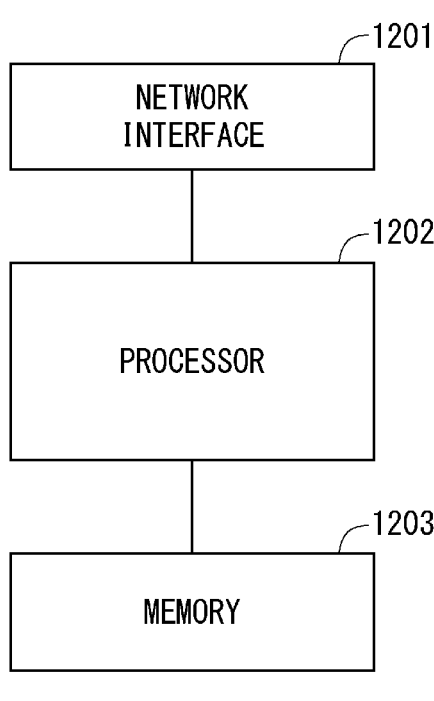
FIG. 14 shows an example of a hardware configuration of a communication apparatus according to the example embodiments.

FIG. 14 shows an example of a hardware configuration of the information processing apparatus 1, the server apparatus 30, and the communication terminals 20 and 40 (hereafter referred to as information processing apparatus 1 and so on) described in the above described example embodiments. With reference to FIG. 14, the information processing apparatus 1 and so on include a network interface 1201, a processor 1202, and a memory 1203. The network interface 1201 is used to communicate with other communication apparatuses included in the service provision system.

The processor 1202 reads software (computer program) from the memory 1203 and executes it to perform processing of, for example, the information processing apparatus 1 described using flowchart in the above described example embodiments. The processor 1202 may be, for example, a microprocessor, an MPU (Micro Processing Unit), or a CPU (Central Processing Unit). The processor 1202 may include a plurality of processors.

The memory 1203 is composed of a combination of volatile memory and non-volatile memory. The memory 1203 may include a storage that is separate from the processor 1202. In this case, the processor 1202 may access the memory 1203 through an I/O interface not shown.

In the example of FIG. 14, the memory 1203 is used to store software modules. By reading these software modules from the memory 1203 and executing them, the processor

1202 can perform processing of the information processing apparatus 1 and the like described in the above example embodiments.

As explained using FIG. 14, each of the processors in the information processing apparatus and the like in the above described example embodiments executes one or more programs including instructions for causing the computer perform the algorithm described with reference to the drawings.

In the above example, the program can be stored and provided to the computer using any type of non-transitory computer readable media. Examples of non-transitory computer readable media include tangible storage media. Examples of non-transitory computer readable media include magnetic storage media (e.g. floppy disks, magnetic tapes, hard disk drives, etc.), and optical magnetic storage media (e.g. magneto-optical disks). Examples of non-transitory computer readable media further include CD-ROM (Read Only Memory), CD-R, and CD-R/W. Examples of non-transitory computer readable media further include semiconductor memories. Examples of semiconductor memories include mask ROM, PROM (Programmable ROM), EPROM (Erasable PROM), flash ROM, RAM (Random Access Memory), etc.

The program may be provided to the computer using any type of transitory computer readable media. Examples of transitory computer readable media include electric signals, optical signals, and electromagnetic waves. Transitory computer readable media can provide the program to the computer via a wired communication line (e.g. electric wires, and optical fibers) or a wireless communication line.

The present disclosure is not limited to the above example embodiments and may be changed as appropriate without departing from the scope. In addition, the present disclosure may be implemented by combining each example embodiment as appropriate.

The whole or part of the example embodiments disclosed above can be described as, but not limited to, the following supplementary notes.

Supplementary Note 1

An information processing apparatus comprising:

acquisition means for acquiring a first received signal strength of a beacon signal at a communication terminal transmitted from at least one beacon transmitter arranged in each of a plurality of areas arranged along a route;

specification means for specifying a first area among the plurality of areas where a user using the communication terminal is present and an area movement history of the user based on the first received signal strength; and control means for deciding whether or not to provide a service to the communication terminal based on the first area and the area movement history.

Supplementary Note 2 the information processing apparatus according to Supplementary note 1, wherein in each of the plurality of areas, a beacon group including two or more beacon transmitters is arranged, and the specification means calculates a second received signal strength indicating a received signal strength for each beacon group based on the first received signal strength, specifies the first area based on the second received signal strength, and specifies the area movement history based on the specified area.

Supplementary Note 3

The information processing apparatus according to Supplementary note 2, wherein
the specification means decides the beacon group with the strongest second received signal strength, calculates a duration time until the beacon group with the strongest second received signal strength is changed, and specifies the first area based on the duration time.

Supplementary Note 4

The information processing apparatus according to Supplementary note 3, wherein
the specification means calculates a total time of the duration time in a first determination time and specifies the first area based on a ratio of the total time to the first determination time.

Supplementary Note 5

The information processing apparatus according to any one of Supplementary notes 2 to 4, wherein
the specification means counts the number of times the beacon signal is received in a second determination time for each of the beacon transmitters included in the beacon group, and calculates the second received signal strength by using a value of the received signal strength of the beacon transmitter where the number of times the beacon is received is less than a first threshold as a dummy value of the received signal strength.

Supplementary Note 6

The information processing apparatus according to any one of Supplementary notes 2 to 5, wherein
the beacon transmitters included in the beacon group are arranged opposite to each other across the route.

Supplementary Note 7

The information processing apparatus according to any one of claims 1 to 6, wherein
the control means decides a movement direction of the user based on the area movement history and decides whether or not to provide the service to the communication terminal based on the first area and the movement direction.

Supplementary Note 8

The information processing apparatus according to Supplementary note 7, wherein
when the control means provides the service to the communication terminal, the control means provides the communication terminal with the service corresponding to the movement direction.

Supplementary Note 9

The information processing apparatus according to Supplementary note 7 or 8, wherein
when the control means provides the service to the communication terminal, the control means changes the service provided to the communication terminal according to whether or not the route branches toward the movement direction with reference to a second area where the user was before the first area.

Supplementary Note 10

The information processing apparatus according to any one of Supplementary notes 1 to 9, wherein
when the control means provides the service to the communication terminal, the control means specifies the second area where the user was present before the first area based on the area movement history, and provides the communication terminal with the service corresponding to a combination of the first area and the second area.

Supplementary Note 11

The information processing apparatus according to any one of Supplementary notes 1 to 10, wherein
when the control means provides the service to the communication terminal, the control means provides the communication terminal with the service corresponding to the area movement history.

Supplementary Note 12

A service provision method comprising:
acquiring a first received signal strength of a beacon signal at a communication terminal transmitted from at least one beacon transmitter arranged in each of a plurality of areas arranged along a route;
specifying a first area among the plurality of areas where a user using the communication terminal is present and an area movement history of the user based on the first received signal strength; and
deciding whether or not to provide a service to the communication terminal based on the first area and the area movement history.

Supplementary Note 13

A non-transitory computer readable medium storing a program for causing a computer to execute processing of:
acquiring a first received signal strength of a beacon signal at a communication terminal transmitted from at least one beacon transmitter arranged in each of a plurality of areas arranged along a route;
specifying a first area among the plurality of areas where a user using the communication terminal is present and an area movement history of the user based on the first received signal strength; and
deciding whether or not to provide a service to the communication terminal based on the first area and the area movement history.

Supplementary Note 14

A service provision system comprising:
a plurality of beacon transmitters arranged in plurality of areas arranged along a route; and
an information processing apparatus, wherein
the information processing apparatus:
acquires a first received signal strength of a beacon signal at a communication terminal transmitted from at least one beacon transmitter among the plurality of beacon transmitters;

specifies a first area among the plurality of areas where a user using the communication terminal is present and an area movement history of the user based on the first received signal strength; and decides whether or not to provide a service to the communication terminal based on the first area and the area movement history.

Supplementary Note 15

The service provision system according to Supplementary note 14, wherein in each of the plurality of areas, a beacon group including two or more beacon transmitters among the plurality of beacon transmitters is arranged, and the information processing apparatus decides a second received signal strength indicating a received signal strength for each beacon group based on the first received signal strength, specifies the first area based on the second received signal strength, and specifies the area movement history based on the specified area.

REFERENCE SIGNS LIST

1 INFORMATION PROCESSING APPARATUS
2 ACQUISITION UNIT
3 SPECIFICATION UNIT
4 CONTROL UNIT
10_1 TO 10_1N BEACON TRANSMITTER
20, 40 COMMUNICATION TERMINAL
30 SERVER APPARATUS
31, 41 ACQUISITION UNIT
32, 42 SPECIFICATION UNIT
33, 43 CONTROL UNIT
34, 45 STORAGE UNIT
44 OUTPUT UNIT
100, 200 SERVICE PROVISION SYSTEM

What is claimed is:

1. An information processing apparatus comprising:
at least one memory storing instructions, and
at least one processor configured to execute, according to the instructions, a process comprising:
acquiring a first received signal strength of a beacon signal at a communication terminal transmitted from at least one beacon transmitter arranged in each of a plurality of areas arranged along a route;
specifying a first area among the plurality of areas where a user using the communication terminal is present and an area movement history of the user based on the first received signal strength; and
deciding whether or not to provide a service to the communication terminal based on the first area and the area movement history, wherein
in each of the plurality of areas, a beacon group including two or more beacon transmitters is arranged, and
the specifying includes:
calculating a second received signal strength indicating a received signal strength for each beacon group based on the first received signal strength,
specifying the first area based on the second received signal strength, and
specifying the area movement history based on the specified area.

2. The information processing apparatus according to claim 1, wherein
the specifying the first area includes deciding the beacon group with the strongest second received signal strength, calculating a duration time until the beacon group with the strongest second received signal strength is changed, and specifying the first area based on the duration time.

3. The information processing apparatus according to claim 2, wherein
the specifying the first area includes calculating a total time of the duration time in a first determination time and specifying the first area based on a ratio of the total time to the first determination time.

4. The information processing apparatus according to claim 1, wherein
the calculating the second received signal strength includes counting the number of times the beacon signal is received in a second determination time for each of the beacon transmitters included in the beacon group, and calculating the second received signal strength by using a value of the received signal strength of the beacon transmitter where the number of times the beacon is received is less than a first threshold as a dummy value of the received signal strength.

5. The information processing apparatus according to claim 1, wherein
the beacon transmitters included in the beacon group are arranged opposite to each other across the route.

6. The information processing apparatus according to claim 1, wherein
the deciding includes deciding a movement direction of the user based on the area movement history and deciding whether or not to provide the service to the communication terminal based on the first area and the movement direction.

7. The information processing apparatus according to claim 1, wherein
the process further comprises providing, when the service to the communication terminal is provided, the communication terminal with the service corresponding to the movement direction.

8. The information processing apparatus according to claim 7, wherein
the providing includes changing, when the service to the communication terminal is provided, the service provided to the communication terminal according to whether or not the route branches toward the movement direction with reference to a second area where the user was before the first area.

9. The information processing apparatus according to claim 7, wherein
the providing includes specifying, when the service to the communication terminal is provided, the second area where the user was present before the first area based on the area movement history, and providing the communication terminal with the service corresponding to a combination of the first area and the second area.

10. The information processing apparatus according to claim 7, wherein
the providing includes providing, when the service to the communication terminal is provided, the communication terminal with the service corresponding to the area movement history.

11. A service provision method comprising:
acquiring a first received signal strength of a beacon signal at a communication terminal transmitted from at least one beacon transmitter arranged in each of a plurality of areas arranged along a route;
specifying a first area among the plurality of areas where a user using the communication terminal is present and an area movement history of the user based on the first received signal strength; and deciding whether or not to provide a service to the communication terminal based on the first area and the area movement history, wherein in each of the plurality of areas, a beacon group including two or more beacon transmitters is arranged, and the specifying includes:

calculating a second received signal strength indicating a received signal strength for each beacon group based on the first received signal strength, specifying the first area based on the second received signal strength, and specifying the area movement history based on the specified area.

12. A non-transitory computer readable medium storing a program for causing a computer to execute processing of:

acquiring a first received signal strength of a beacon signal at a communication terminal transmitted from at least one beacon transmitter arranged in each of a plurality of areas arranged along a route;

specifying a first area among the plurality of areas where a user using the communication terminal is present and an area movement history of the user based on the first received signal strength; and deciding whether or not to provide a service to the communication terminal based on the first area and the area movement history, wherein in each of the plurality of areas, a beacon group including two or more beacon transmitters is arranged, and the specifying includes:

calculating a second received signal strength indicating a received signal strength for each beacon group based on the first received signal strength, specifying the first area based on the second received signal strength, and specifying the area movement history based on the specified area.

* * * * *